(12) United States Patent
Razumov

(10) Patent No.: US 8,721,250 B2
(45) Date of Patent: May 13, 2014

(54) ROBOTIC DEVICE MOVABLE IN THREE MUTUALLY PERPENDICULAR DIRECTIONS

(76) Inventor: Sergey N. Razumov, Moscow (RU)

(*) Notice: Subject to any disclaimer, the term of this patent is extended or adjusted under 35 U.S.C. 154(b) by 139 days.

(21) Appl. No.: 13/546,492

(22) Filed: Jul. 11, 2012

(65) Prior Publication Data

US 2014/0014470 A1 Jan. 16, 2014

(51) Int. Cl.
*B65G 1/00* (2006.01)
*B65G 65/00* (2006.01)

(52) U.S. Cl.
USPC ........... 414/281; 414/279; 414/282; 414/471; 198/463.3; 198/468.6; 108/144.11; 901/7

(58) Field of Classification Search
USPC ............ 414/279, 281, 282, 283, 284, 331.14, 414/331.17; 198/347.4, 463.3, 468.6; 108/144.11, 147.11; 700/214, 230; 701/19; 901/7
See application file for complete search history.

(56) References Cited

U.S. PATENT DOCUMENTS

| | | | | |
|---|---|---|---|---|
| 4,273,494 A * | 6/1981 | Swain et al. | .................. | 414/266 |
| 4,372,219 A * | 2/1983 | Gibbs | ........................... | 104/165 |
| 4,395,181 A * | 7/1983 | Loomer | ....................... | 414/284 |
| 4,657,463 A * | 4/1987 | Pipes | ............................. | 414/495 |
| 4,690,601 A * | 9/1987 | Delius et al. | ............... | 414/795.3 |
| 4,856,956 A * | 8/1989 | Zur | ................................ | 414/280 |
| 5,139,384 A * | 8/1992 | Tuttobene | .................... | 414/281 |
| 5,213,463 A * | 5/1993 | Rothlisberger et al. | ....... | 414/280 |
| 5,433,293 A * | 7/1995 | Sager | ............................ | 187/249 |
| 5,501,295 A * | 3/1996 | Muller et al. | ................. | 187/406 |
| 5,564,880 A * | 10/1996 | Lederer | ......................... | 414/280 |
| 5,658,120 A * | 8/1997 | Watanabe | ...................... | 414/495 |
| 5,839,872 A * | 11/1998 | Goto et al. | .................... | 414/280 |
| 5,952,796 A * | 9/1999 | Colgate et al. | .................... | 318/1 |
| 5,967,728 A * | 10/1999 | Gales et al. | .................... | 414/284 |
| 6,149,366 A * | 11/2000 | Deandrea | ...................... | 414/279 |
| 6,602,039 B1 * | 8/2003 | Dimitri et al. | ................ | 414/281 |
| 6,889,813 B1 * | 5/2005 | Trammell et al. | ........... | 198/346.3 |
| 6,929,440 B1 * | 8/2005 | Grond | ........................... | 414/284 |
| 7,128,521 B2 * | 10/2006 | Hansl | ............................. | 414/807 |
| 7,381,022 B1 * | 6/2008 | King | ............................. | 414/267 |
| 7,559,738 B2 * | 7/2009 | Salm et al. | .................... | 414/799 |

(Continued)

FOREIGN PATENT DOCUMENTS

FR 1435526 A 4/1966

OTHER PUBLICATIONS

International Search Report PCT/IB2013/001507 dated Nov. 18, 2013.

*Primary Examiner* — Douglas Hess
(74) *Attorney, Agent, or Firm* — McDermott Will & Emery LLP

(57) ABSTRACT

A robotic device movable in first, second and third mutually perpendicular directions along rails arranged in multiple rows, where the rails in a row are arranged along the first and second mutually perpendicular directions, and the multiple rows are arranged along the third direction perpendicular to the first and second directions. The robotic device has a frame, wheels coupled to the frame for moving the frame along the rails in the first and second directions, and support handles for lifting the frame in the third direction from first rails arranged in a first row of the rails to second rails arranged in a second row of the rails. The support handles are configured for providing engagement with the second rails so as to lift the robotic device in the third direction from the first rails to the second rails.

17 Claims, 11 Drawing Sheets

(56) References Cited

U.S. PATENT DOCUMENTS

| | | | |
|---|---|---|---|
| 7,591,630 B2 * | 9/2009 | Lert, Jr. | 414/807 |
| 7,753,637 B2 * | 7/2010 | Benedict et al. | 414/140.3 |
| 7,784,407 B2 * | 8/2010 | Di Rosa et al. | 104/48 |
| 7,787,985 B2 * | 8/2010 | Tsujimoto et al. | 700/214 |
| 7,837,424 B2 * | 11/2010 | Solomon | 414/331.04 |
| 7,871,232 B2 * | 1/2011 | Lutz | 414/279 |
| 7,959,396 B2 * | 6/2011 | Izumi | 414/279 |
| 8,105,005 B2 * | 1/2012 | Yoshida et al. | 414/282 |
| 8,403,614 B2 * | 3/2013 | Bastian et al. | 414/282 |
| 8,527,153 B2 * | 9/2013 | Doan | 701/49 |

* cited by examiner

ROBOTIC DEVICE MOVABLE IN THREE MUTUALLY PERPENDICULAR DIRECTIONS

TECHNICAL FIELD

This disclosure relates to robotics, and more particularly, to a robotic device that can move in three mutually perpendicular directions without assistance of external lifts.

BACKGROUND ART

Conventional robotic systems include lifts provided for moving robotic devices in a vertical direction. However, the number of lifts in any efficient robotic system employing multiple robots is substantially less than the number of robots. Therefore, "bottlenecks" are created near the lifts, reducing the throughput of the robotic system.

Therefore, there is a need for a new "self-lifting" technique that would enable a robotic device to move in three mutually perpendicular directions without assistance of an external lift.

SUMMARY OF THE DISCLOSURE

In accordance with one aspect, the present disclosure offers a robotic device movable in first, second and third mutually perpendicular directions along rails arranged in multiple rows, where the rails in a row are arranged along the first and second mutually perpendicular directions, and the multiple rows are arranged along the third direction perpendicular to the first and second directions.

The robotic device of the present disclosure has a frame, wheels coupled to the frame for moving the frame along the rails in the first and second directions, and support handles for lifting the frame in the third direction from first rails arranged in a first row of the rails to second rails arranged in a second row of the rails. The support handles are configured for providing engagement with the second rails to lift the robotic device in the third direction from the first rails to the second rails.

For example, the support handles may be provided on a platform movable in the third direction and causing the frame to move in the third direction when the support handles are engaged with the second rails. Each of the support handles may include an L-shaped pin attached to the movable platform.

Further, the support handles may provide engagement with the first rails to enable the robotic device to turn from the first direction to the second direction.

The wheels may be aligned along the first direction to rotate along the first rails so as to enable the robotic device to move along the first rails in the first direction.

The support handles engaged with the second rails may cause the frame to be lifted above the first rails at a level sufficient to disengage the wheels from the first rails.

A wheels turning mechanism may be provided on the frame for turning the wheels with respect to the first direction after the wheels are disengaged from the first rails. The wheels turning mechanism may be configured for turning the wheels so as to make a width of the robotic device in the second direction smaller than a distance between the second rails in the second direction.

For example, the wheels turning mechanism may include vertical pivots corresponding to the wheels for turning the respective wheels about vertical axes of the pivots.

After the wheels are turned with respect to the first direction, the support handles engaged with the second rails may cause the frame to be lifted to a level above the second rails.

The wheels turning mechanism may turn the wheels to return them into the first direction after the frame is lifted to the level above the second rails.

After returning the wheels into the first direction, the support handles may be disengaged from the second rails to place the wheels on the second rails.

When the support handles are engaged with the first rails to turn the robotic device from the first direction to the second direction, the support handles may cause the frame to be lifted above the first rails at a level sufficient to disengage the wheels from the first rails.

When the wheels are disengaged from the first rails, the wheels turning mechanism may turn the wheels in a horizontal plane from the first direction to the second direction.

The support handles may be disengaged from the first rails to place the wheels on third rails extending in the second direction.

In accordance with a method of the present disclosure, the following steps are carried out to operate a robotic device having a frame with wheels, and support handles:
  rotating the wheels for moving the frame on first rails in a first horizontal direction,
  engaging the support handles with second rails arranged in the first horizontal direction above the first rails, and
  moving the frame in a vertical direction using the support handles engaged with the second rails so as to place the wheels on the second rails.

The support handles may be engaged with the second rails so as to lift the frame above the first rail at a level sufficient to disengage the wheels from the first rails.

After lifting the frame above the first rails, the wheels may be turned in a horizontal plane with respect to the first direction so as to make a width of the robotic device in a second horizontal direction, which is perpendicular to the first horizontal direction, smaller than a distance between the second rails in the second horizontal direction.

When the wheels are turned with respect to the first direction, the support handles may be used to lift the robotic device to a level above the second rails.

After lifting the robotic device above the second rails, the wheels may be turned into the first direction.

When the wheels are turned into the first direction, the support handles may be disengaged from the second rails to place the wheels onto the second rails.

The method of the present disclosure may further involve the step of engaging the support handles with the first rails so as to turn the robotic device moving on the first rails into a second horizontal direction perpendicular to the first horizontal direction.

After engaging the support handles with the first rails, the frame may be lifted above the first rail to a level sufficient to disengage the wheels from the first rails and turn the wheels into the second horizontal direction.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using exemplary embodiments described in the present disclosure. It will become apparent, however, that the concept of the disclosure is applicable to any robotic device movable in three mutually perpendicular directions.

Figure 1:
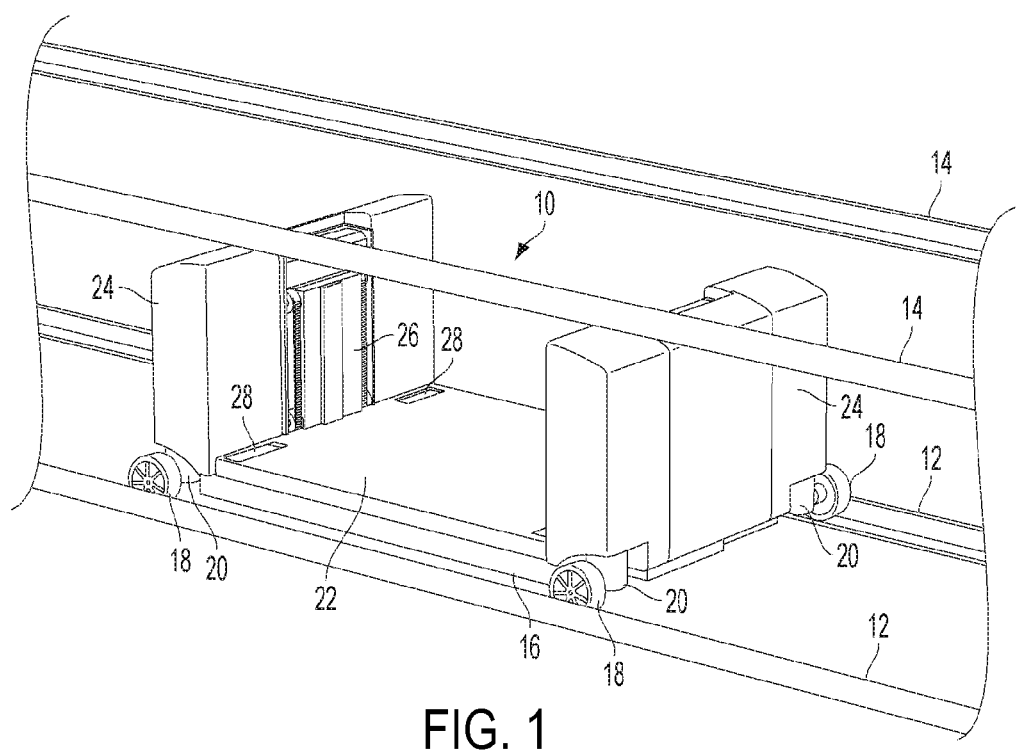
FIG. 1 shows an exemplary embodiment of a robotic device of the present disclosure.

FIG. 1 shows an exemplary embodiment of a robotic device 10 of the present disclosure. The robotic device 10 may move along a pair of rails 12 that extends in a horizontal direction. FIG. 1 shows only rails extending in a single horizontal direction. However, the robotic system of the present disclosure may also include horizontal rails perpendicular to the rails 12 shown in FIG. 1. As discussed below, the robotic device 10 may move along the rails arranged in mutually perpendicular horizontal directions.

The rails 12 may be arranged in multiple rows arranged in a vertical direction on different levels with respect to the ground. FIG. 1 shows a pair of rails 12 on which the robotic device 10 currently stands, and a pair of rails 14 arranged in the next row above the rails 12. For example, the rails 12 and 14 may be L-shaped rails.

The robotic device 10 may have a frame 16 with four wheels 18 attached to the frame 16. The frame 16 may be formed as a braced structure for supporting elements required to operate the robotic device 10. Each wheel 18 may be attached to the frame 16 so as to rotate in a vertical plane about an axis extending from the center of the wheel 18 in order to move the robotic device 10 along the rails.

Four vertical pivots 20 may be used for attaching the respective wheels 18 to the frame so as to turn each wheel 18 in a horizontal plane about the vertical axis of the respective pivot 20. For example, each wheel 18 may be turned in a horizontal plane about 90 degrees with respect to the direction of rails. Each vertical pivot 20 is arranged with respect to the frame 16 so as to make the width of the robotic device 10 with the wheels 18, smaller than a distance between adjacent rails in a direction perpendicular to the direction of the rails, when the wheels 18 are turned into the direction perpendicular to the direction of the rails.

As discussed below, the wheels 18 may be turned in a horizontal plane to support moving the robotic device 10 in the vertical direction, and to support turning the robotic device 10 to a horizontal direction perpendicular to a current horizontal direction of the robotic device 10. Although in an exemplary embodiment, the robotic device 10 has four wheels 18, one skilled in the art would realize that the present concept is applicable to any number of wheels that can be provided to support movement of the robotic device 10.

The frame 16 may hold a movable platform 22 that can be used for carrying loads such as goods delivered by the robotic device 10 in a robotic retail environment. For example, the platform 22 may be a rectangular metal plate configured to accommodate boxes or pallets with goods. Side walls 24 may be provided on the frame 16 to support carrying loads.

As discussed below, the platform 22 may be moved in a vertical direction to support vertical movements of the robotic device 10. Platform lifting mechanisms 26 may be arranged on the side walls 24 for moving the platform 22 up or down in a vertical direction. For example, as shown in FIG. 1, each platform lifting mechanism 26 may be implemented using a belt drive.

Deployable support handles 28 may be attached to the platform 22. FIG. 1 shows the support handles 28 held in an undeployed state in slots formed on the platform 22. As discussed below, the support handles 28 may be L-shaped pins extended from the platform 22 to support moving the robotic device 10 in a vertical direction and changing a horizontal direction of the robotic device 10.

Figure 2:
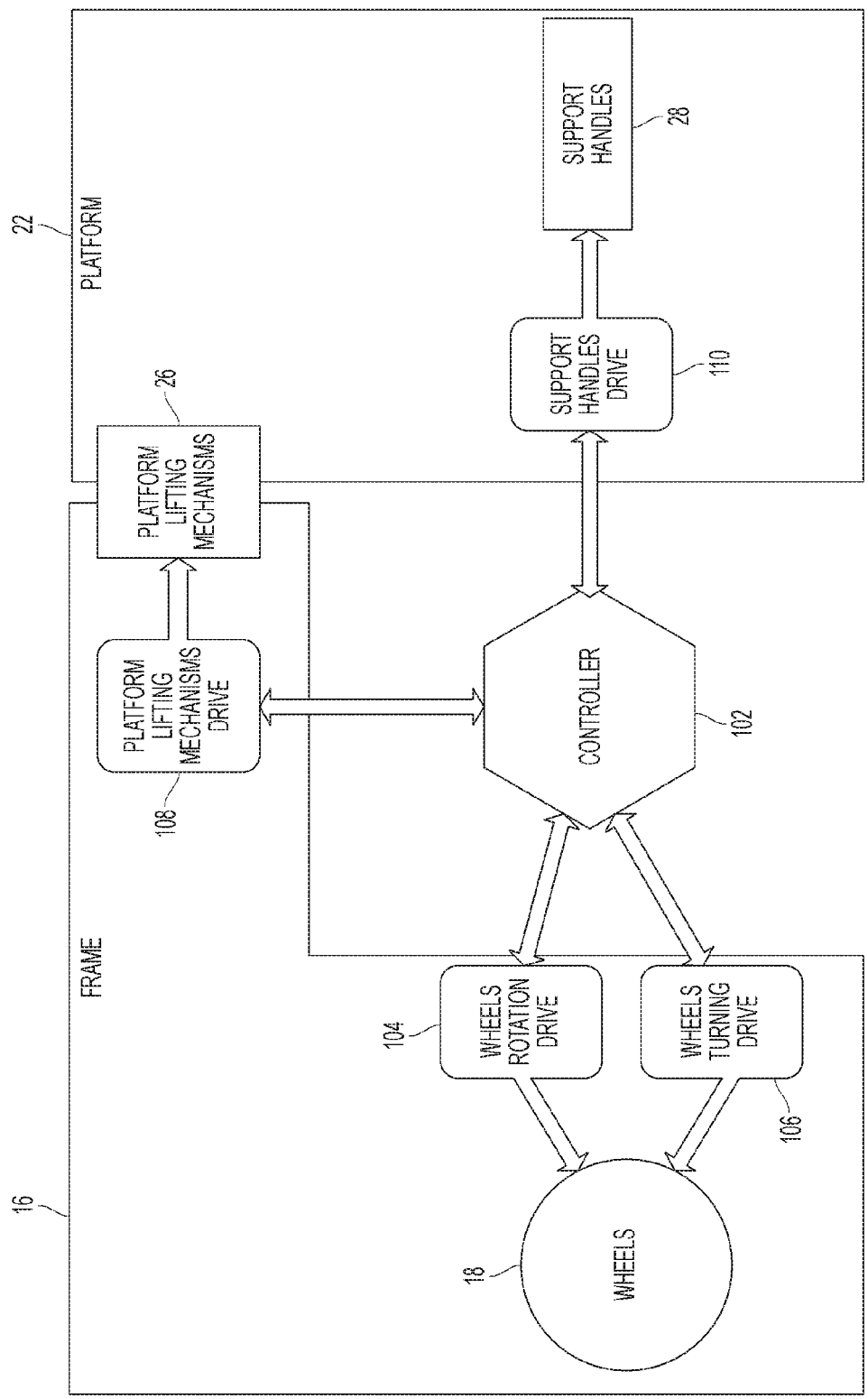
FIG. 2 is a simplified exemplary diagram showing elements for providing operation of the robotic device in FIG. 1.

FIG. 2 is a simplified diagram that illustrates elements for performing various operations performed by the robotic device 10. The operations of the robotic device 10 are controlled by a controller 102 that may include a data processor responsive to external commands for processing the commands and producing various control signals. The controller may have a radio transceiver for providing bidirectional data communications with external objects via a radio network, such as a WiFi network. A controller area network (CAN) bus may connect the controller 102 with various elements of the robotic device 10 to supply control signals to the elements of the robotic device 10 and receive responses.

In particular, the controller 102 may control a wheels rotation drive 104, a wheels turning drive 106, a platform lifting mechanisms drive 108, and a support handles drive 110. The wheels rotation drive 104, wheels turning drive 106 and platform lifting mechanisms drive 108 may be arranged on the frame 16, whereas the support handles drive 110 may be arranged on the movable platform 22. The wheels rotation drive 104 is provided for driving the wheels 18 so as to rotate them in a vertical plane in order to move the robotic device 10 along the rails in a horizontal direction. The wheels turning drive 106 drives the vertical pivots 20 so as to turn the respective wheels 18 in a horizontal plane. The wheels 18 may be turned 90 degrees about the vertical axes of the pivots 20. As one skilled in the art would realize, the wheels drives 104 and 106 may be implemented using any of well known mechanisms for rotating and turning wheels.

The platform lifting mechanisms drive 108 is provided for driving the platform lifting mechanisms 26 that move the platform 22 up and down in a vertical direction. As one skilled in the art would realize, the platform lifting mechanisms 26 and drive 108 may be implemented using any well known mechanisms for moving a plate up and down.

The support handles drive 110 is used for extending the support handles 28 from the slots on the platform 22 when the support handles 28 are required for supporting movements of the robotic device 10, and for hiding the support handles 28 back into the slots on the platform 22 when the support handles 28 are no longer required. The drive 110 may be implemented using any well known mechanism for extending a pin.

Figure 3:
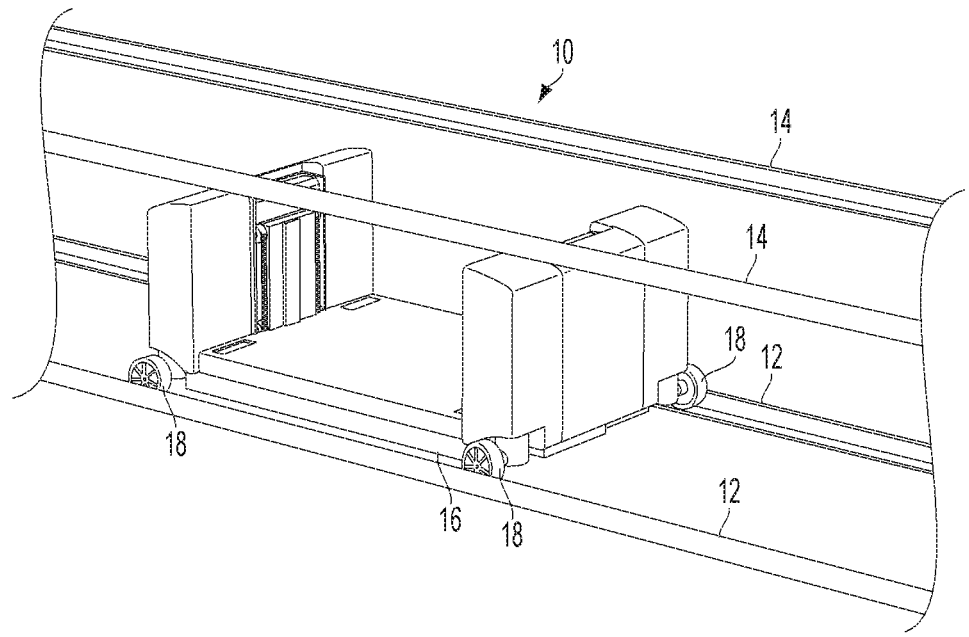
FIGS. 3-9 illustrate exemplary operations performed for moving the robotic device in a vertical direction.
Figure 4:
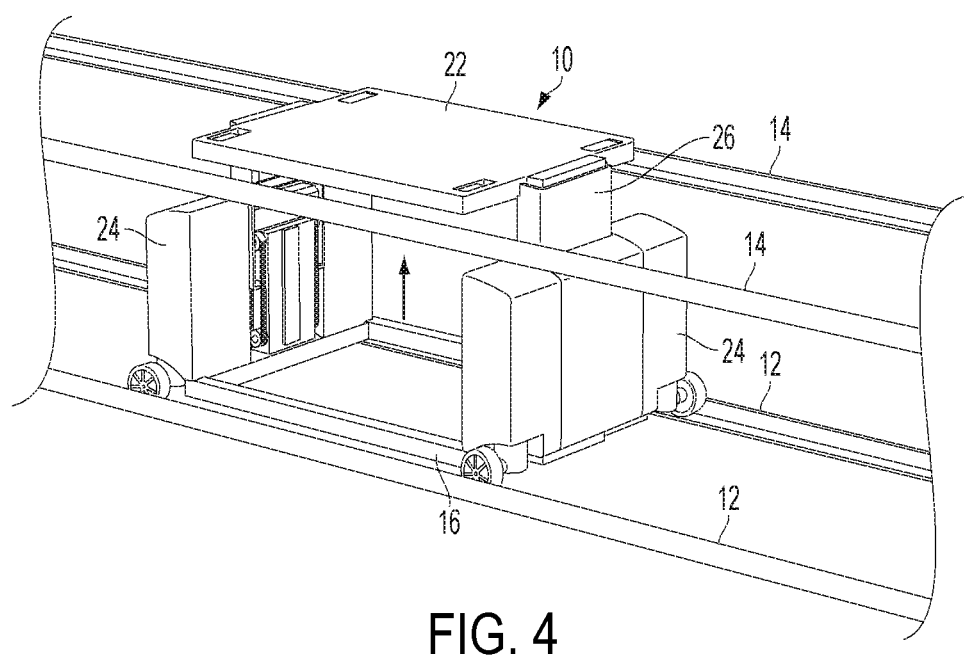

FIGS. 3-9 illustrate operations performed by the robotic device 10 when it moves in a vertical direction. In particular, FIG. 3 shows a robotic device 10 having its wheels 18 standing on the lower rails 12. The platform 22 may be positioned on the frame 16. As illustrated in FIG. 4, at the beginning of the vertical movement, the controller 102 may control the platform lifting mechanisms drive 108 to activate the platform lifting mechanisms 26 at the both side walls 24 so as to raise the platform 22 to a level above the rails 14 provided in the next row of the rails with respect to the rails 12.

Figure 5:
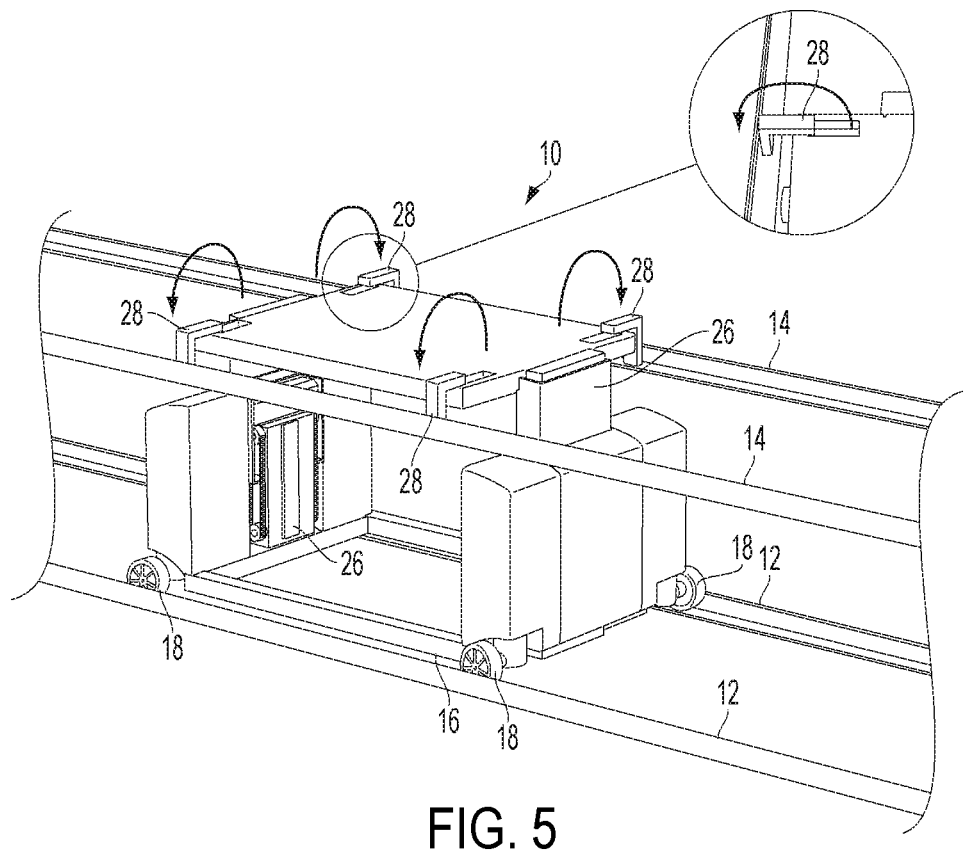

As shown in FIG. 5, after the platform 22 is raised to a desired level above the rails 14 or simultaneously with raising the platform 22, the support handles drive 110 is controlled to deploy the support handles 28. The deployment of the support handles 28 may be provided by extending each of them from the respective slot on the platform 22 to a position directly above the respective rail 14.

For example, each support handle 28 may be implemented as an L-shaped support pin 28 shown in FIG. 5. During the deployment, the support pin 28 may be extended and placed directly above the respective rail 14. Thereafter, the platform 22 is lowered to a lower position so as to engage each support pin 28 with the respective rail 14 and raise the frame 16 with respect to the rails 12 to a level sufficient to disengage the wheels from the rails 12.

Figure 6:
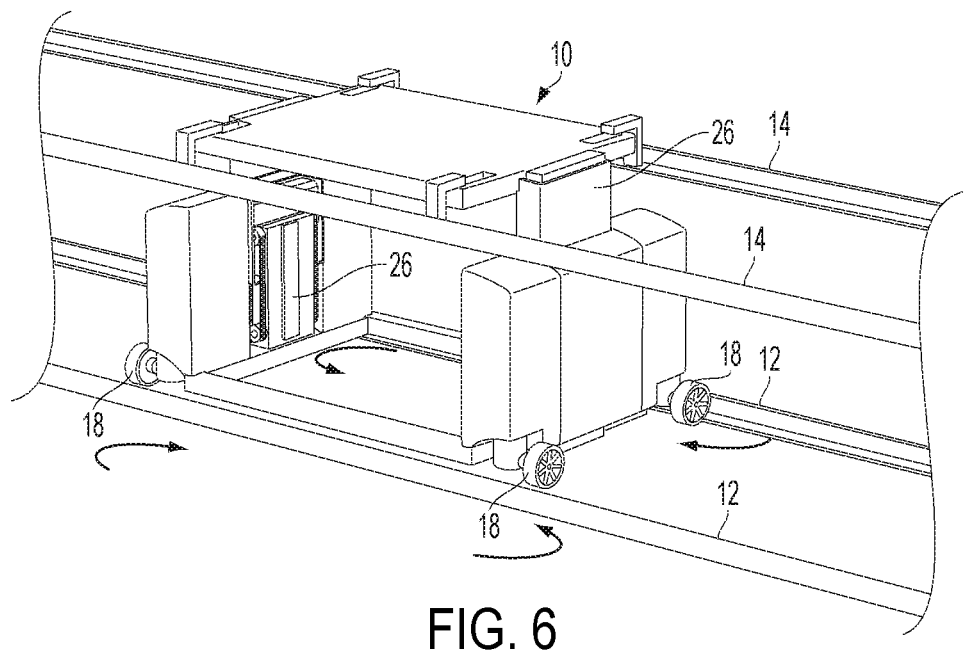

As shown in FIG. 6, when the wheels 18 become disengaged from the rails 12, the wheels turning drive 106 is controlled so as to turn each of the wheels 18 in a horizontal plane using the respective vertical pivots 20. For example, each wheel 18 may be turned about the vertical axis of the pivot 20 by an angle equal to approximately 90 degrees. The position of the vertical pivots 20 with respect to the frame 16 is selected so as to provide the maximum distance between the edges of the turned wheels 18 in a direction perpendicular to the direction of the rails, smaller than the distance between the rails in the horizontal direction.

Figure 7:
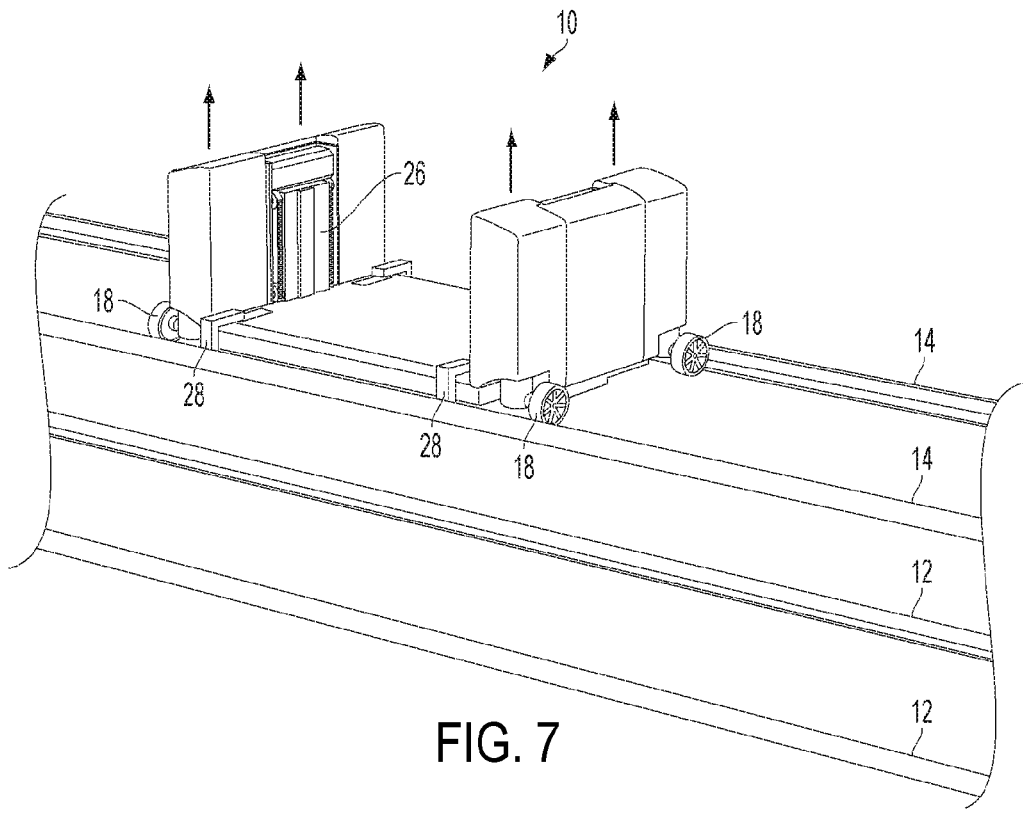

As shown in FIG. 7, the support handles 28 fix the platform 22 on the rail 14 so as to enable the platform lifting mechanisms 26 to lift the frame 16 when the platform lifting mechanisms 26 is controlled by the platform lifting mechanisms drive 108 to reduce the distance between the platform 22 and the frame 16 in a vertical direction. The frame 16 may be lifted to a level above the rails 14 so as to place the platform 22 on the frame 16. As the distance between the edges of the turned wheels 18 is less than the distance between the rails 14 in a direction perpendicular to the direction of the rails 14, the frame 16 with the wheels 18 can be transferred in the space between a pair of the horizontal rails 14.

Figure 8:
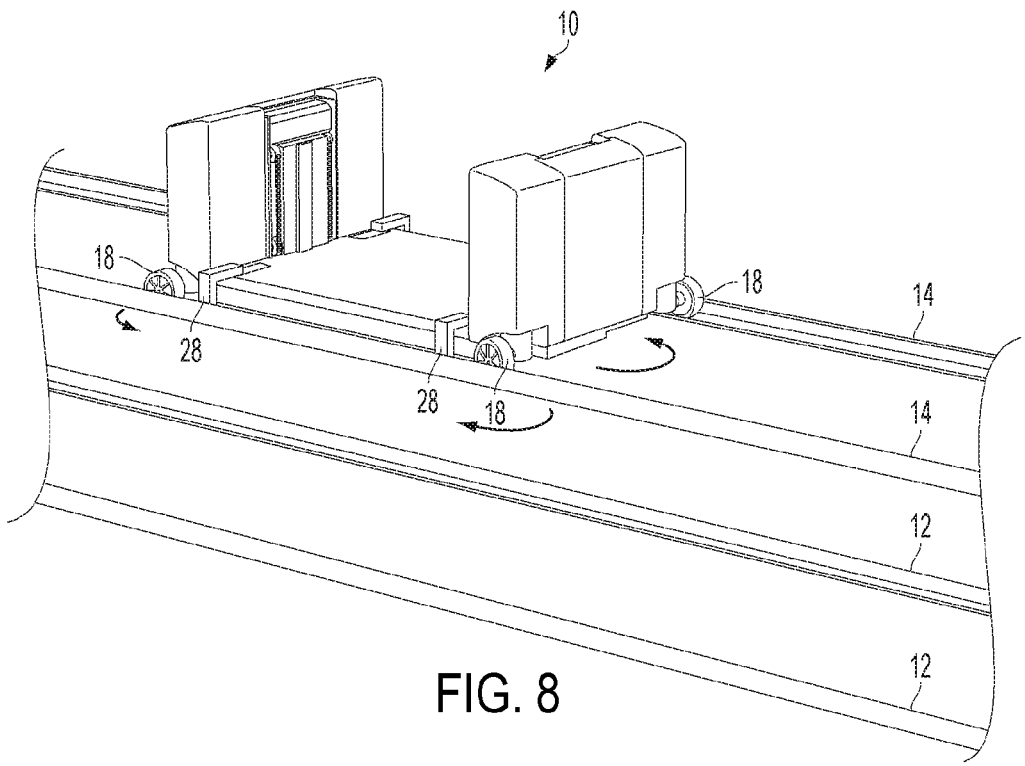

As shown in FIG. 8, when the frame 16 is raised to a desired position above the rails 14, the wheel turning drive 106 is controlled to turn the wheels 18 using the respective vertical pivots 20 so as to return each wheel 18 to an initial position along the rails.

Figure 9:
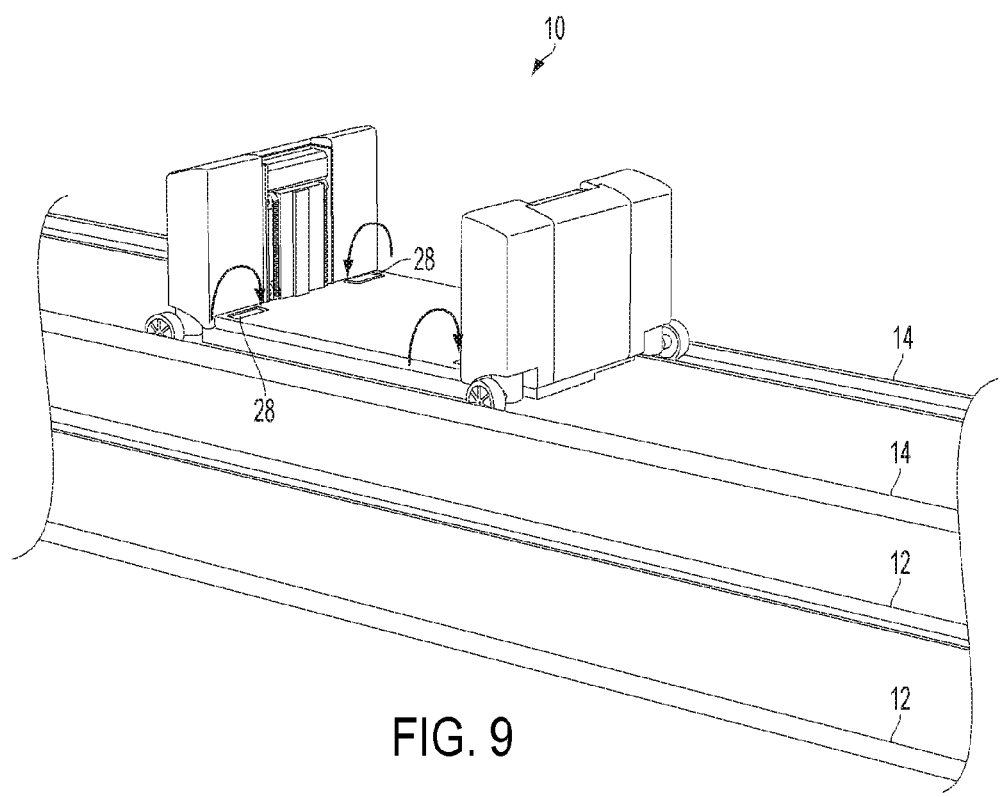

Thereafter, as shown in FIG. 9, the support handles 28 may be removed from the rails 14 and placed in the respective slots on the platform 22. As a result, the frame 16 is lowered so as to place the wheels 18 on the rails 14.

Hence, the robotic device 10 standing on lower rails 12 can lift itself in a vertical direction to a level of higher rails 14 in the next row of rails so as to continue movement along the rails 14. As one skilled in the art would realize, a similar technique can be used to move the robotic device 10 down in a vertical direction from higher rails 14 to lower rails 12 in the next row of the rails. No external lifting device is required for moving the robotic device up or down in a vertical direction.

Figure 10:
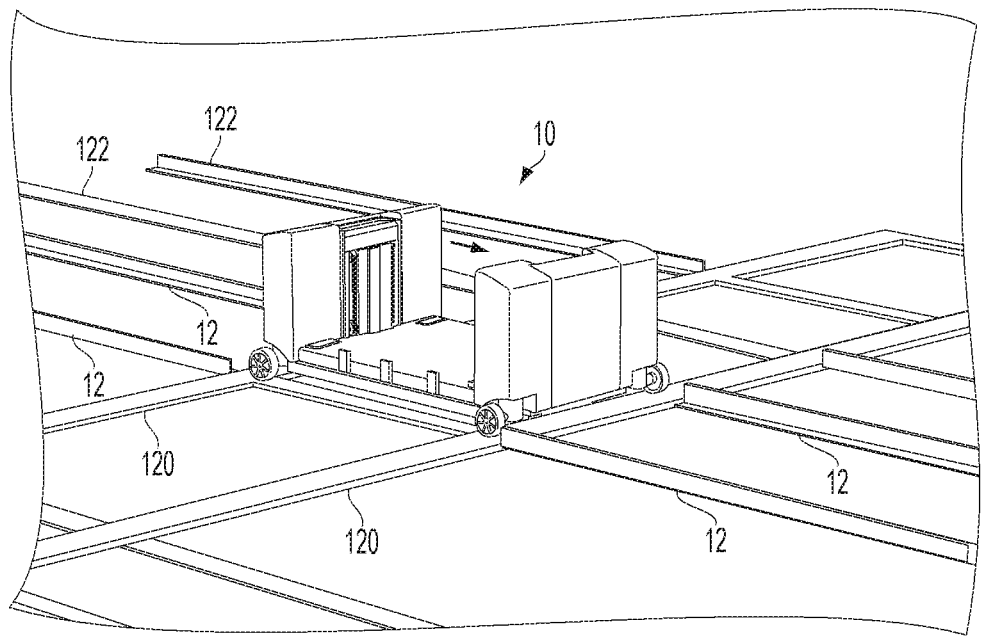
FIGS. 10-17 illustrate exemplary operations performed for changing a horizontal direction of the robotic device.

FIGS. 10-17 illustrate operations performed by the robotic device 10 to turn into a horizontal direction perpendicular to a current horizontal direction. In particular, the robotic device 10 that moves along the rails 12 extending in a first horizontal direction may need to turn into a horizontal direction perpendicular to the direction of the rails 12. As shown in FIG. 10, the robotic device 10 may reach an intersection between a pair of the rails 12 and a pair of rails 120 extending in the horizontal direction perpendicular to the direction of the rails 12. For example, the robotic device 10 may need to use the rails 120 to move to a pair of rails 122 extending in the horizontal plane in a direction parallel to the direction of the rails 12.

Figure 11:
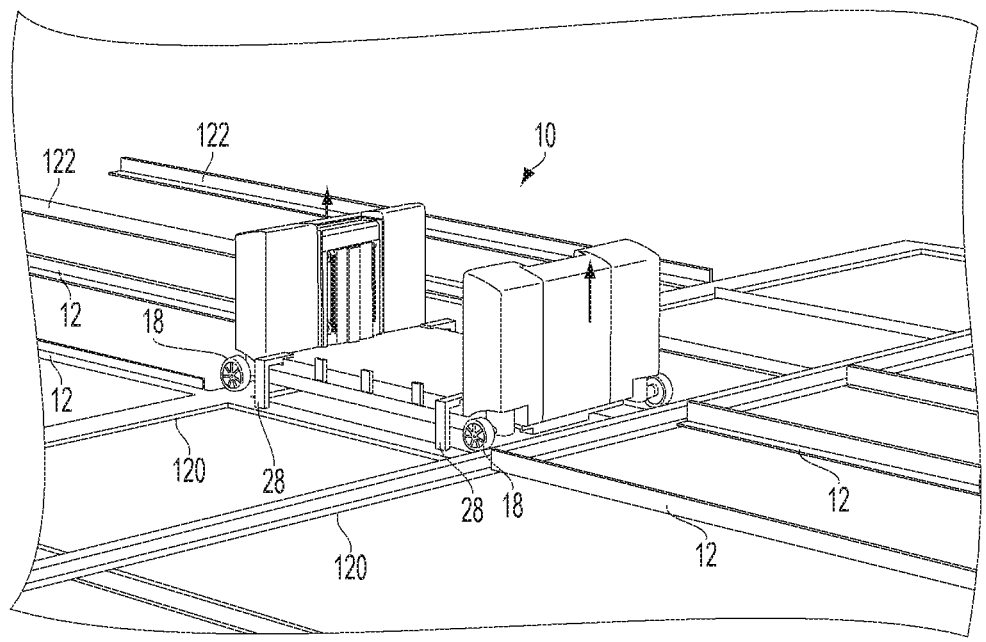

As shown in FIG. 11, to turn the robotic device 10 into the direction of the rails 120, the controller 102 may control the support handles drive 110 to deploy the support handles 28. In particular, the support handles drive 110 extends the L-shaped pins 28 so as to engage them with the rails 12. When the pins 28 push against the rails 12, the robotic device 10 becomes slightly raised above the rails 12 so as to disengage the wheels 18 from the rails 12.

Figure 12:
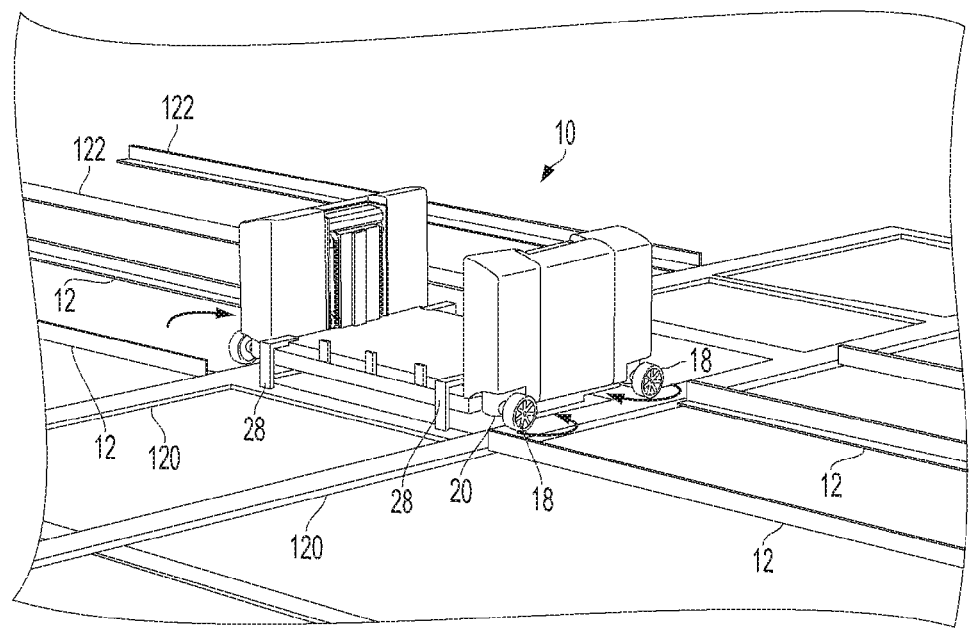

As shown in FIG. 12, when the wheels 18 are disengaged from the rails 12, the wheels turning drive 106 is activated to turn the wheels 18 in a horizontal plane using the vertical pivots 20. The wheels 18 may be turned by approximately 90 degrees about the vertical axes of the pivots 20.

Figure 13:
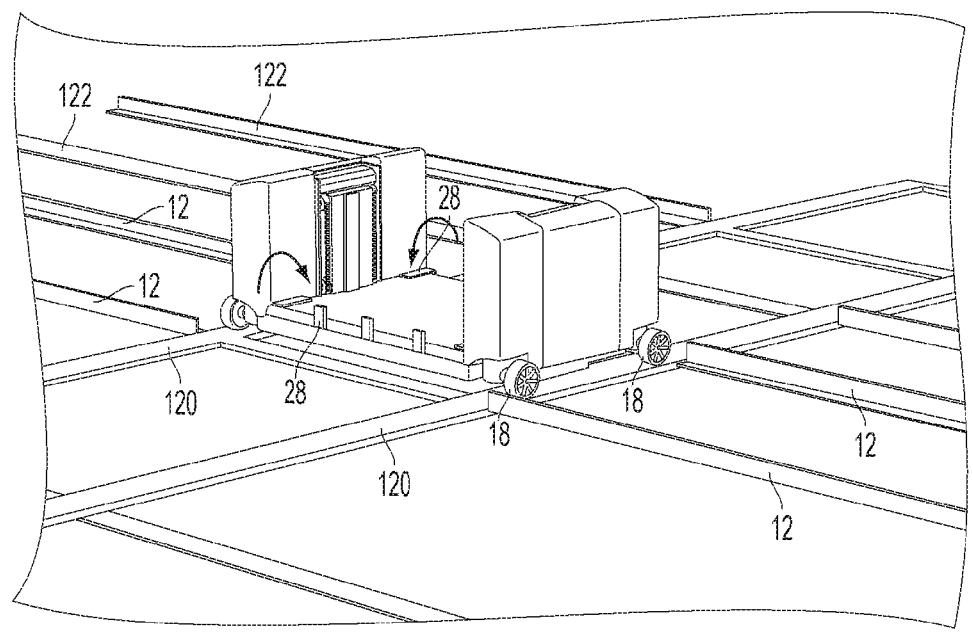

As shown in FIG. 13, after the wheels 18 are turned in a horizontal plane, the support handles drive 110 is controlled to remove the support handles 28. As a result, the wheels 18 are placed onto the rails 120 so as to enable the robotic device 10 to move along the rails 120. The distance between the wheels 18 in the horizontal direction along the rails 120 is selected in accordance with the interval between the rails 120. The support handles 28 may be placed into the respective splits on the platform 22.

Figure 14:
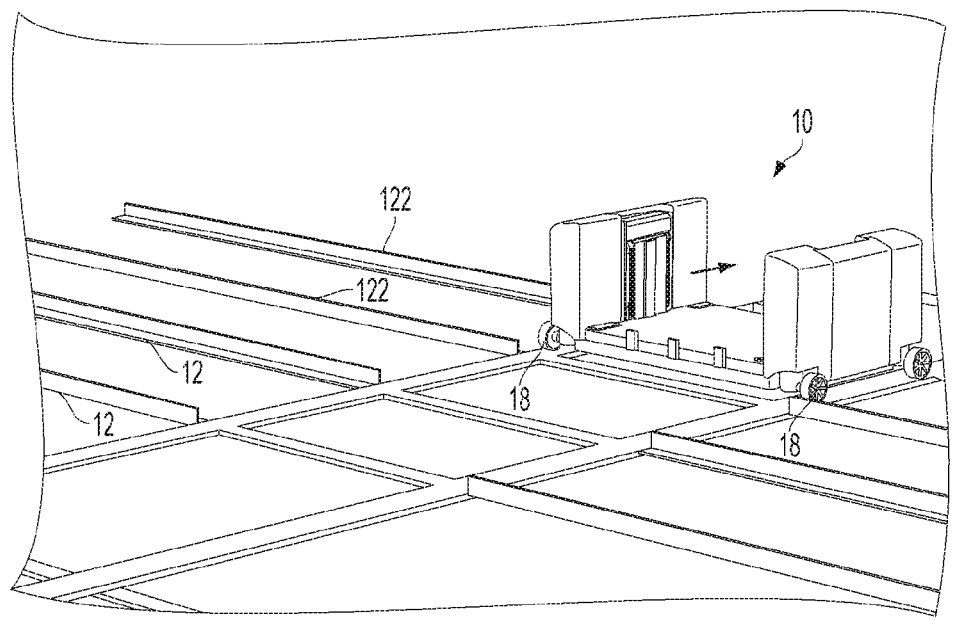
Figure 15:
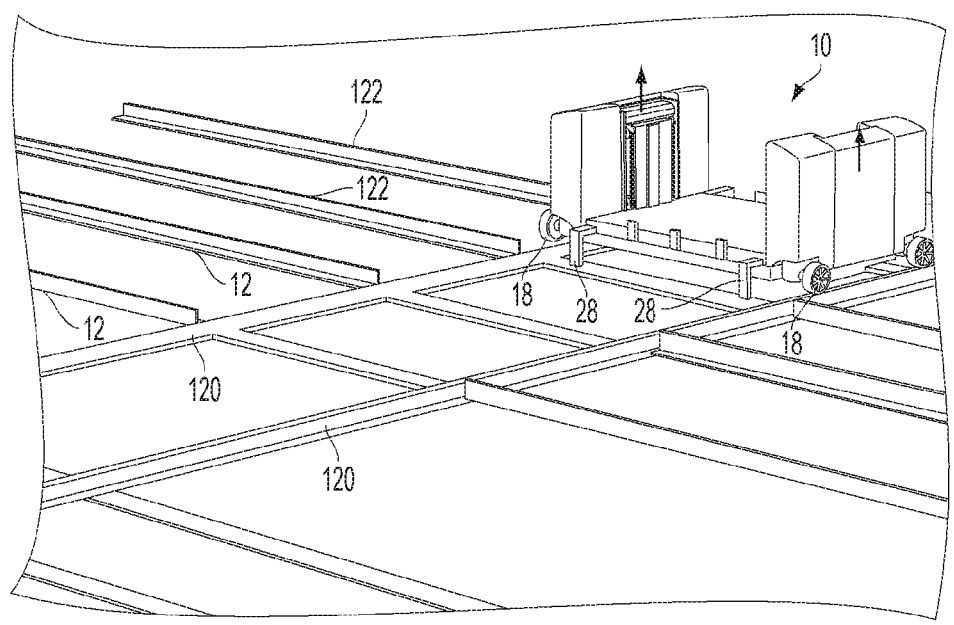

As shown in FIG. 14, the robotic device 10 may move along the rails 120 until an intersection with a desired pair of rails 122. As shown in FIG. 15, when a desired intersection is reached, the controller 102 controls the support handles drive 110 to deploy the support handles 28 so as to engage them with the rails 122. When the support handles 28 push against the rails 122, the robotic device 10 becomes slightly raised so as to disengage the wheels 18 from the rails 120.

Figure 16:
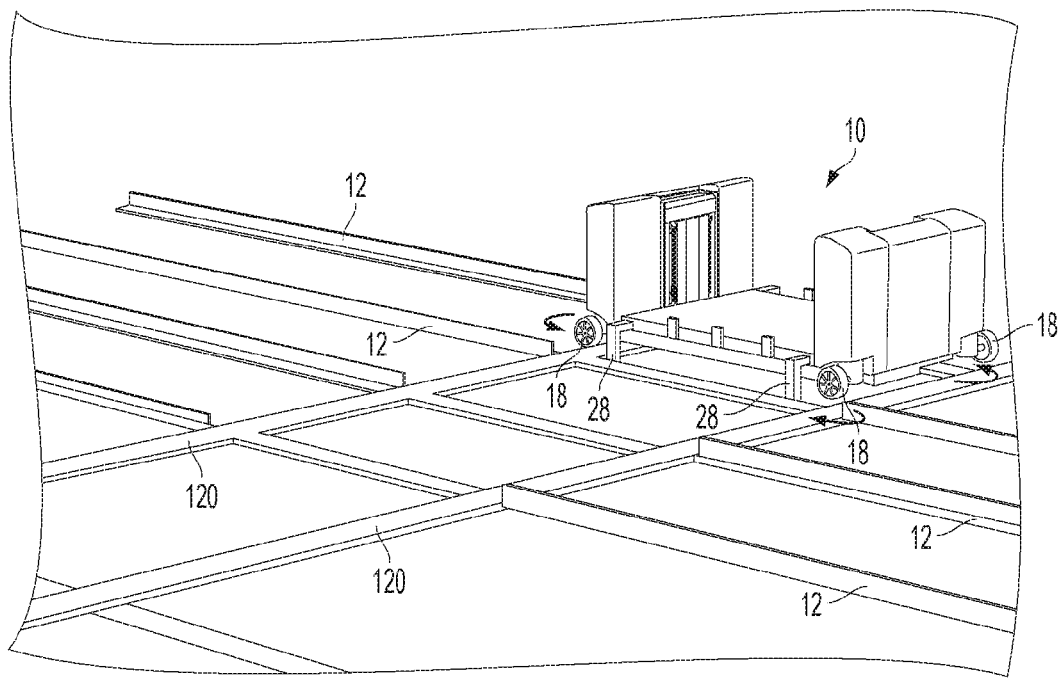
Figure 17:
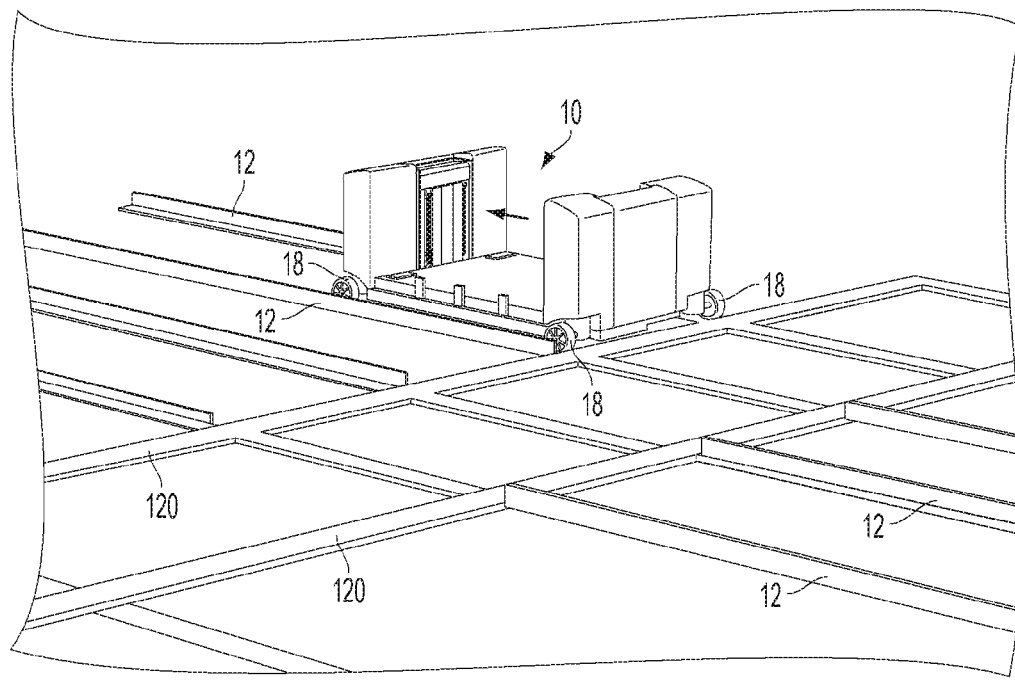

As shown in FIG. 16, when the wheels 18 are disengaged from the rails 120, the wheels turning drive 106 is controlled to turn the wheels in a horizontal plane using the pivots 20. Thereafter, as shown in FIG. 17, the support handles drive 110 is controlled to remove the support handles 28 so as to place the robotic device 10 on the rails 122. As a result, the robotic device 10 is enabled to move along the rails 122.

Figure 18:
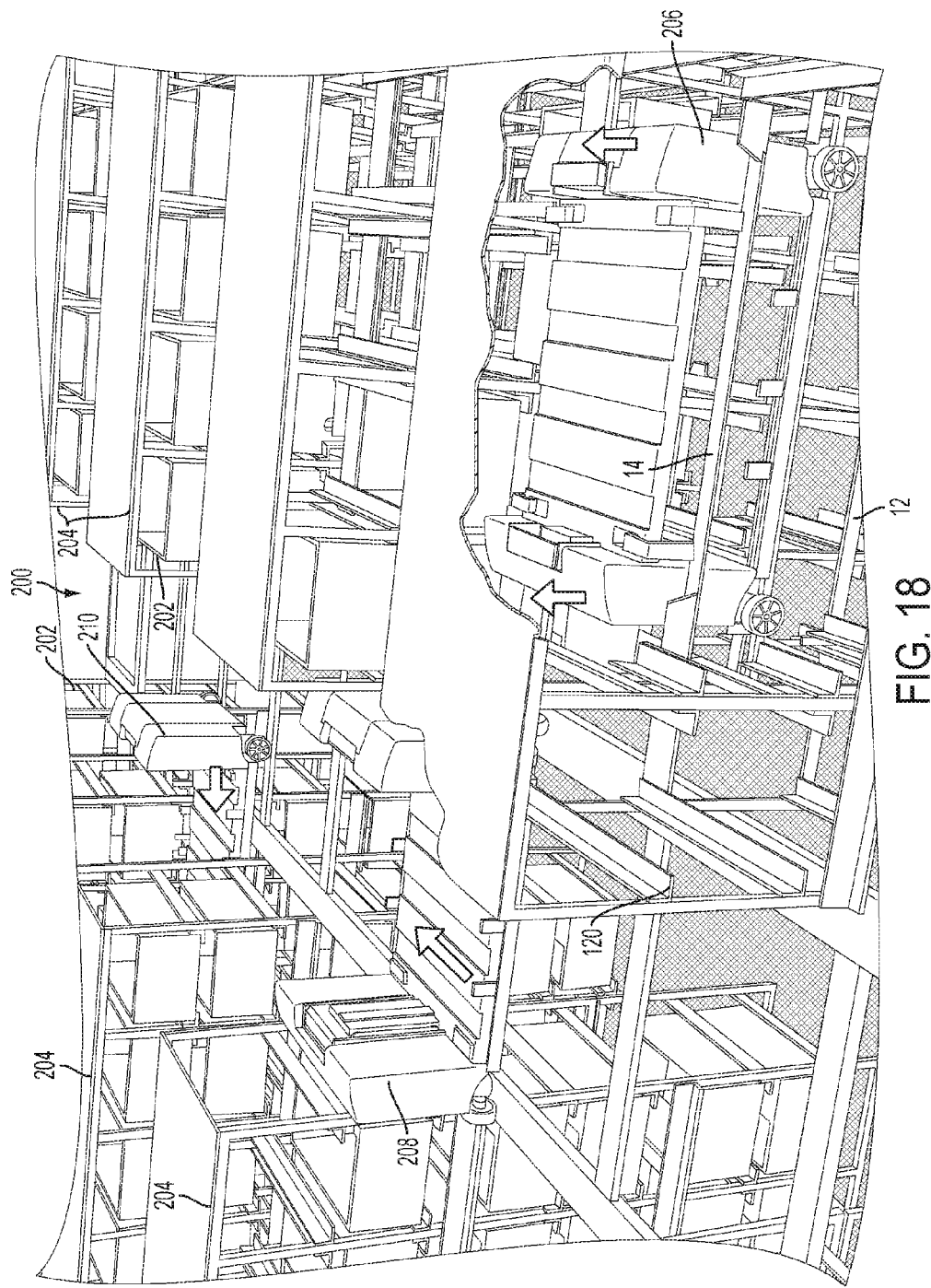
FIG. 18 illustrates an exemplary environment in which the robotic device of the present disclosure may operate.

FIG. 18 illustrates an exemplary robotic system 200 in which the robotic device 10 may be employed. The robotic system 200 may be installed in a retail storage facility or warehouse, in which multiple robotic devices 10 may provide access to storage cells 202. The storage facility may have multiple storage racks 204, each of which include the storage cells 202 arranged in multiple horizontal rows and multiple vertical columns. Multiple pairs of horizontal rails may be provided in horizontal rows corresponding to the rows of the storage cells 202, at different vertical levels corresponding to the columns of the storage cells 202. For example, FIG. 18 shows the rails 12 and 14 extending at different vertical levels along the rows of the storage cells 202 of each storage rack 204, where the rails 14 are provided at a level above the level of the rails 12. Rails 120 may be provided between the storage racks 204 in the horizontal direction perpendicular to the direction of the rails 12 and 14. The rails 120 may be arranged in multiple rows corresponding to the rows of the storage cells 202, at different vertical levels corresponding to the columns of the storage cells 202.

FIG. 18 illustrates a robotic device 206 moving in a vertical direction from the rails 12 to the rails 14. Another robotic device 208 shown in FIG. 18 moves along the rails 120 in the horizontal direction perpendicular to the direction of the rails 12 and 14. A further robotic device 210 in FIG. 18 moves along rails in a horizontal direction parallel to the direction of the rails 12 and 14. Hence, robotic devices in the robotic system 200 may move in three mutually perpendicular directions without any external lifting devices.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A robotic device movable in first, second and third mutually perpendicular directions along rails arranged in multiple rows, the rails in a row being arranged along the first and second directions, the rows being arranged along the third direction perpendicular to the first and second directions, the robotic device comprising:
   a frame,
   wheels coupled to the frame for moving the frame along the rails in the first and second directions,
   support handles for lifting the frame in the third direction from first rails arranged in a first row of the rails to second rails arranged in a second row of the rails, the support handles being configured for providing engagement with the second rails so as to lift the robotic device in the third direction from the first rails to the second rails, the support handles engaged with the second rails causing the frame to be lifted above the first rails at a level sufficient to disengage the wheels from the first rails, and
   a wheels turning mechanism for turning the wheels with respect to the first direction when the wheels are disengaged from the first rails, the wheels turning mechanism being configured for turning the wheels so as to make a width of the robotic device in the second direction smaller than a distance between the second rails in the second direction.

2. The robotic device of claim 1 wherein the support handles are configured for providing engagement with the first rails so as to enable the robotic device to turn from the first direction to the second direction.

3. The robotic device of claim 2, wherein the wheels are aligned along the first direction to rotate along the first rails so as to enable the robotic device to move along the first rails in the first direction.

4. The robotic device of claim 2, wherein the support handles engaged with the first rails cause the frame to be lifted above the first rails at a level sufficient to disengage the wheels from the first rails.

5. The robotic device of claim 4, further comprising a wheels turning mechanism for turning the wheels in a horizontal plane from the first direction to the second direction after the wheels are disengaged from the first rails.

6. The robotic device of claim 5, wherein the support handles are disengaged from the first rails to place the wheels on third rails extending in the second direction.

7. The robotic device of claim 1, wherein the support handles engaged with the second rails cause the frame to be lifted to a level above the second rails, when the wheels are turned with respect to the first direction.

8. The robotic device of claim 7, wherein the wheels turning mechanism turns the wheels to return the wheels into the first direction, when the frame is lifted to the level above the second rails.

9. The robotic device of claim 8, wherein after returning the wheels into the first direction, the support handles are disengaged from the second rails to place the wheels on the second rails.

10. The robotic device of claim 1, wherein the support handles are provided on a platform movable in the third direction and configured for transferring the frame in the third direction when the support handles are engaged with the second rails.

11. The robotic device of claim 10, wherein each of the support handles includes an L-shaped pin attached to the movable platform.

12. A method of operating a robotic device having a frame with wheels, and support handles, the method comprising the steps of:
   rotating the wheels for moving the frame on first rails in a first horizontal direction,
   engaging the support handles with second rails arranged in the first horizontal direction above the first rails, and
   moving the frame in a vertical direction using the support handles engaged with the second rails so as to place the wheels on the second rails, wherein
   the support handles are engaged with the second rails so as to lift the frame above the first rail at a level sufficient to disengage the wheels from the first rails, and
   after lifting the frame above the first rails, the wheels are turned in a horizontal plane with respect to the first direction so as to make a width of the robotic device in a second horizontal direction, which is perpendicular to the first horizontal direction, smaller than a distance between the second rails in the second horizontal direction.

13. The method of claim 12, wherein after turning the wheels, the support handles are used to lift the robotic device above the second rails.

14. The method of claim 13, wherein after lifting the robotic device above the second rails, the wheels are turned into the first direction.

15. The method of claim 14, wherein after turning the wheels into the first direction, the support handles are disengaged from the second rails to place the wheels onto the second rails.

16. The method of claim 12, further comprising the step of engaging the support handles with the first rails so as to turn the robotic device moving on the first rails into a second horizontal direction perpendicular to the first horizontal direction.

17. The method of claim 16, wherein after engaging the support handles with the first rails, the frame is lifted above the first rail to a level sufficient to disengage the wheels from the first rails and turn the wheels into the second horizontal direction.

* * * * *